Sept. 4, 1962 ICHITARO TSUCHIYA 3,052,761

HANDSET TYPE OF TELEPHONE UNIT

Filed April 15, 1959 2 Sheets-Sheet 1

Inventor
Ichitaro Tsuchiya
by Hill, Sherman, Meroni, Gross & Simpson
Attys

Inventor
Ichitaro Tsuchiya
by Hill, Sherman, Meroni, Gross & Simpson Attys

United States Patent Office 3,052,761

Patented Sept. 4, 1962

3,052,761
HANDSET TYPE OF TELEPHONE UNIT

Ichitaro Tsuchiya, 1167 Iwato, Komae-machi,
Kitatama-gun, Tokyo, Japan

Filed Apr. 15, 1959, Ser. No. 806,663
Claims priority, application Japan Dec. 20, 1958
4 Claims. (Cl. 179—81)

This invention relates generally to an improved handset telephone unit of the self-contained and amplifying type and more particularly to such units of the interphone and self-powered type to be connected in parallel to each other or to similar units for calling and communication.

It is an object of this invention to provide improved such telephone handset units of the self-contained and amplifying type to be connected in parallel to other or similar units in a building or in a restricted private area to facilitate inter-communication.

Another and more specific object hereof is to provide a compact handset telephone unit of the amplifying and self-contained type having its casing assembly parts in unit with, and in an improved relation with, corresponding unit parts of its complete telephone apparatus in said casing and, more particularly, such a handset unit having a transistor amplifier unit in an improved relation in its casing assembly, which is of the compact size and shape of an ordinary handset telephone unit.

A further and more detailed object hereof resides in the provision of such a handset telephone unit of the amplifying and self-contained type having an improved relationship and mounting of a calling switch and a press-talk switch in its casing assembly.

A further object of this invention is to provide an interphone handset unit of the self-contained type having both its casing and its complete telephone apparatus in sub units whereby its assembly, inspection and servicing are easier.

Other objects, features and advantages of this invention will be more clearly understood from the foregoing description taken in connection with the accompanying drawings in which.

Figure 1:
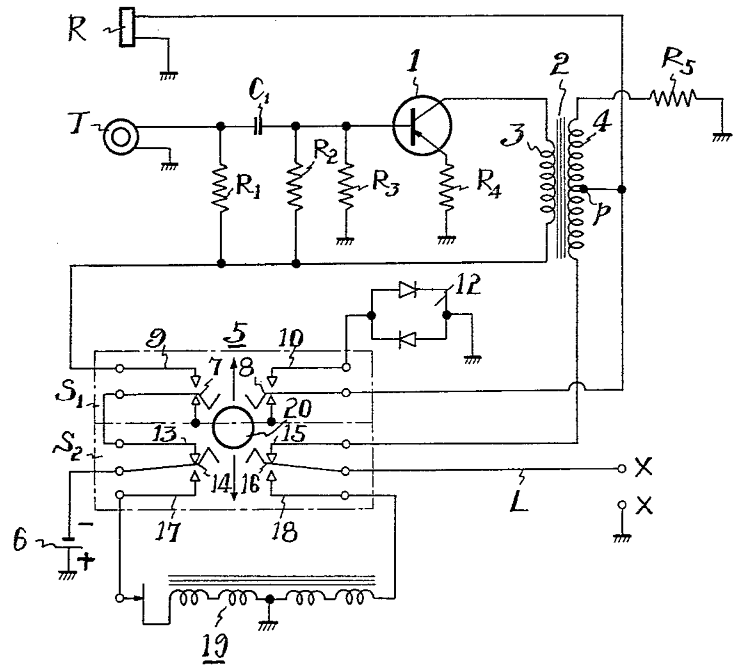
FIGURE 1 is a circuit diagram of the complete telephone apparatus of a unit according to this invention.
Figure 6:
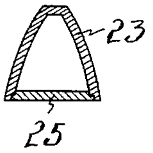
FIGURE 6 is a sectional view taken along the line A—A of FIGURE 2.
Figure 5:
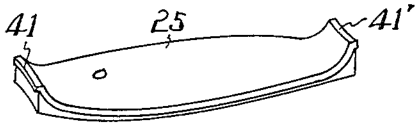
FIGURE 5 is a perspective view of the arm cover.
Figure 2:
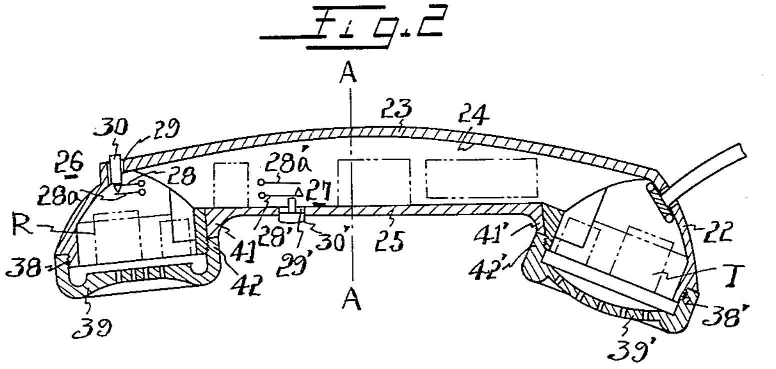
FIGURE 2 is a longitudinal sectional view taken through a handset telephone unit according to this invention.
Figure 3:
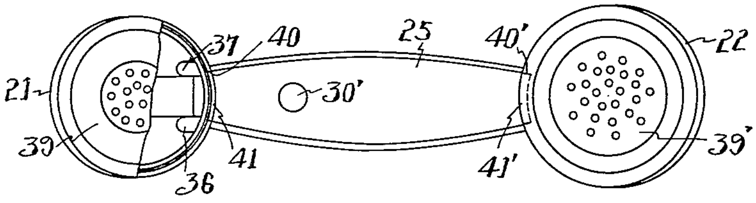
FIGURE 3 is a front elevational view of the unit of this invention, with one part removed.
Figure 4:
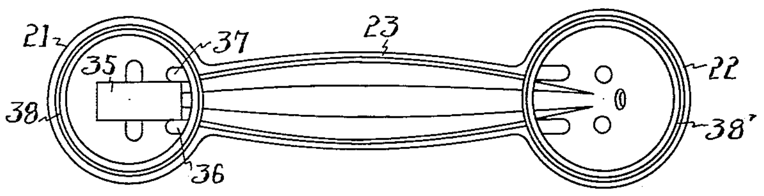
FIGURE 4 is a front elevational view of the same telephone handset unit with the arm covers and head enlargement covers being removed.

Referring to FIGURE 1 as an example of a preferred arrangement and circuit diagram for the electrical or telephone apparatus parts of the unit according to this invention, the circuit and its operation are as follows:

The telephone transmitter portion or unit is designated as a whole by T. Its output is connected to a base type circuit or to the input of a transistor 1. This base circuit includes resistors $R_1$, $R_2$, $R_3$ and capacitor $C_1$. The emitter of this transistor 1 is grounded through resistor $R_4$ and its collector side is connected to one terminal of the primary side 3 of a transformer designated as a whole by 2. One terminal of the secondary side 4 of this transistor 2 is grounded through a resistor $R_5$. The neutral point P of the secondary side 4 of this transformer 2 is connected to one terminal of a suitable telephone apparatus receiver portion or unit designated as a whole by R. The other terminal of each of R and T is grounded as shown.

The other terminal of the primary side 3 of the transformer 2 is connected as shown to the negative side of a suitable electric source, such as the dry cell 6, through a change-over switch 5 which is hereinafter described in more detail. The positive side of the electric source 6 is grounded as shown. The other end of the secondary side 4 of the transformer 2 is connected, through the change-over switch 5, to a suitable wire or line L to be connected to another such telephone apparatus or unit with the earth being used as the return circuit.

This change-over switch 5 comprises two parts. Its upper parts $S_1$ has a pair of movable contacts 7 and 8 which are normally held open with respect to a corresponding pair of stationary contacts 9 and 10. These stationary contacts 9 and 10 are connected respectively to the lower end of the primary side of the transformer 2 and to one side of a varistor 12. The other side of this varistor 12 is grounded. The movable contact 7 is connected to a stationary contact 13 of the lower part $S_2$ of this change-over switch 5. The stationary contact 13 normally engages the movable contact 14 which is connected to the negative side of the dry cell or battery unit 6. The lower end of the secondary side 4 of the transformer 2 is connected to stationary contact 15 of the lower part $S_2$. The contact 15 is normally engaged by movable contact 16 which is, in turn, connected to the line L. Stationary contacts 17 and 18 cooperate respectively with movable contacts 14 and 16 and are connected across a buzzer 19.

The change-over switch 5 is provided with an operating lever 20 which is shown schematically and as in its waiting position in FIGURE 1. When the change-over switch 5 is pulled downwardly as shown by one of the two arrows in FIGURE 1, a calling signal can be transmitted while the upper position of this switch 5 permits communication.

The varistor 12, which as well known to those skilled in this art may be made of silicon carbide, and is connected in parallel to the receiver R only during communication.

This varistor 12 acts to suppress an unwanted calling signal coming from a third telephone unit since its level is higher than the communication level so that the varistor 12 makes it impossible to operate the receiver R by such a third calling signal.

In accordance with this invention and as best shown in FIGURES 2 to 8 inclusive, the above described circuit with its electrical and telephone portions is enclosed in a telephone handset casing assembly which includes the main part or sub-unit formed by the unitary and integral receiver casing 21, transmitter casing 22 and the hollow arm 23 interconnecting them. The receiver R is enclosed by the casing 21 and the transmitter T is enclosed by the casing 22. The other electrical parts, such as the resistor 1, the transformer 2, the dry cell 6, the buzzer 19, the varistor 12, the resistors $R_1$–$R_5$, the capacitor $C_1$ etc. are enclosed in the hollow space 24 of the hollow arm 23 and are suitably attached and mounted on the back face of the arm cover or side 25. These parts may be in any desired arrangement. For example, their arrangement may be as shown by the dash-dot lines in FIGURE 2. For convenience in operation, two push button switches 26 and 27 are provided and correspond to the parts $S_1$ and $S_2$ of the operating lever 20. Specifically, the push button switch designated as a whole by 26 (which corresponds to the lower part $S_2$) is attached to, and extends through, the back part of the receiver casing 21 and is used for calling.

This push button 26 consists of a movable contact 28 comprising a resilient or springy piece (which corresponds to the contacts 14 and 16 of FIGURE 1), the contact 28*a* (corresponding to the contacts 13, 15, 17 and 18 of FIGURE 1) and a push button 30 which extends through hole 29 formed in the rear casing wall of 21 and has its inner end abutting and acting against the springy contact 28 which pushes it outwardly. This last is the position of the corresponding switch as shown in FIGURE 1.

The other or the transmitting push button switch designated as a whole by 27 is suitably attached and mounted on the back or inner face of the arm cover or side 25. Its construction is substantially the same as that of the above described push button switch 26 so that similar reference characters with primes are used to designate corresponding and similar parts and its details need not be further described here.

It will, however, be understood that contact 28′ corresponds to the contacts 7 and 8 in FIGURE 1 and that contact 28*a*′ corresponds to the contacts 9 and 10 in FIGURE 1.

Figure 7:
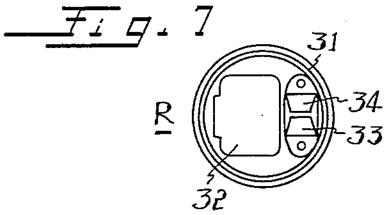
FIGURE 7 is a back elevational view of the combined casing and telephone apparatus unit of this invention.

To facilitate the assembly of the telephone apparatus and unit of this invention, the receiver R is made as a separate sub-unit entirely isolated from the other parts as shown in FIGURE 7 with the receiving element 32 and the pillar terminals 33 and 34 mounted on a supporting plate 31. In the casing 21 there is a terminal plate 35 with stationary contacts 36 and 37 which engage respectively with the pillar terminals 33 and 34 mounted on the bottom plate.

The stationary contacts 36 and 37 are spaced apart or like a gate so that the terminals 33 and 34 may be inserted between them to engage them as explained above and when the sub-unit R is inserted and assembled as explained below.

The casing 21 has the externally threaded edge or rim portion 38 over which the correspondingly threaded head cover 39 is screwed in place. This casing 21 also has a recess 40 in its side wall shaped to match and to be filled by the correspondingly shaped end 41 of the arm cover 25. Accordingly, end 41 to 25 abuts against the rim 42 of the head cover 39 when 39 is screwed onto the threaded rim 38.

Figure 8:
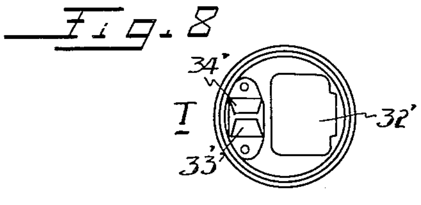
FIGURE 8 is a back elevational view of the combined telephone apparatus and casing unit for the transmitter according to this invention.

The construction and details of the transmitter T and its transmitter case 22 as shown in FIGURE 8 are substantially the same as those for the receiver R and its receiver casing 21 as described above and these parts of T and its casing cooperate in the same manner. Accordingly, the same reference characters with primes are used to designate similar and corresponding elements for T and its casing which are not further described here for the sake of brevity.

Accordingly to this invention, the assembly is facilitated and may be easily done by inserting the receiver sub-unit R and the transmitter sub-unit T into their respective casing portions 21 and 22, placing the arm cover or side 25 into its opening of the arm 23 and then screwing the head covers 39 and 39′ onto their corresponding threaded rims of the casings 21 and 22.

It will be appreciated that here there is no need for other or additional securing means, such as screws, for the assembly of these parts as described above.

Moreover, the apparatus according to this invention provides further advantages in that the battery sub-unit or dry cell, the amplifier sub-unit (including its transistor and the elements) and the other unit parts or portions are suitably mounted on the back of the arm cover or side 25 which is, in turn, easily removed from its installed position. Other and interrelated advantages are provided by the construction of the transmitter and the receiver as separate sub-units which are also easily removed and provided in sections or sub-units for ease of inspection.

It will be understood that a plurality of telephone units as above described and according to this invention may be connected in parallel with each other by the line L.

The operation of the telephone apparatus as thus connected is as follows:

For calling, the switch 5 is pushed down and, more specifically, the push button switch 26 is pushed down to engage the contacts 28 and 28*a* and (in FIGURE 1) move the contact 14 from contact 13 to contact 17. In like manner, contact 16 is moved from engagement with contact 15 to engage contact 18 to connect the buzzer 19 to the power source 6 to transmit the calling signal to the line L. A corresponding telephone apparatus (as shown in FIGURE 1) is in its receiving condition and at the other end of the line L so that the signal current flows through the secondary side of its transformer 2 through the contacts 16 and 15 to actuate its receiver R. The push button switch 27 at the receiving station is pushed up to engage the contacts 7 and 8 with the contacts 9 and 10 respectively in FIGURE 1. Thus, the transistor 1 is connected to the power source 6 through the contacts 7 and 9 and, at the same time, the neutral point P of the secondary side of the transformer 2 is connected to the varistor 12 through the contacts 8 and 10.

At this time, the person at the calling station releases the spring return push button 26 and presses the similar but transmitting permitting push button switch 27.

In this condition, the two telephone units, or the calling and receiving stations, are now completely connected for communication. That is, the voice current from the transmitter T of the calling station is amplified by its amplifying unit, including its transistor 1, and goes to the line L through the transformer 2. This transformer 2 comprises a hybrid type coil which prevents the reception of side tones by the receiver at the station or at the calling station. A calling signal current, which might come from an unwanted third telephone unit, cannot pass through this calling receiver in any large or significant amount owing to the action of the varistor 12.

From the foregoing, it will be readily apparent to workers reasonably skilled in this art that I have provided an improved complete telephone handset unit of the amplifying and self-contained type in which the simple and economically manufactured casing assembly is formed of only a few or a practical minimum of sub-assembly parts (here, specifically only four casing parts or the main casing and arm sub-assembly parts 21, 23, 22, its arm side or cover 25 and the similar and enlargement side opening cover parts or head cover units 39 and 39′ retaining in place of the receiver sub-unit R and the transmitter sub-unit T respectively) with such sub-assembly parts either securing in place or carrying (being combined in a readily removable sub-unit with) separable sub-unit portions of the electrical or telephone type apparatus of this complete device. These casing sub-assembly parts and their corresponding electrical sub-units intercooperate to facilitate assembly, inspection and subsequent servicing and, particularly, to provide a complete, self-contained and self-powered such unit in a handset casing of substantially the same desired conventional size and shape as that of a separately powered, non-amplifying such handset. Important and cooperating features hereof are the full availability of the plurality of electrical sub-units extending along the length of the whole interior of the open sided arm 23 which encloses a plurality of electrical sub-units such as the amplifier sub-unit, the battery sub-unit and others as disclosed above mounted on, and side by side along the entire length of, the inside face of side cover 25 (as described above and schematically shown in FIGURE 2) which is simply retained in place only by the end covers 39 and 39′ which, in turn, hold or retain in place the receiver and the transmitter sub-units respectively with all controlled by the accessible and better locations and mountings of the calling and transmitting push button switch sub-units as described above.

While I have explained only one particular embodiment of my invention, it is to be understood, of course, that I do not wish to be limited thereto since many modifications thereof may be made and I, therefore, contemplate by the appended claims to cover any such modifications as fall within the spirit and scope of my invention.

What I claim is:

1. A telephone handset unit of the self-contained and self-powered, amplifying type comprising: in combination, (a) a simple, compact hollow handset casing assembly of a few removably interconnected parts and (b) a complete telephone apparatus in said hollow casing assembly and divided into readily serviced electrical sub-units retained in place by corresponding ones of said casing assembly parts for the best utilization of available space in such a compact handset casing with (c) electrical circuit means operatively interconnecting said telephone units and including contacts cooperatively engaged upon the assembly insertion of each such telephone sub-unit, (d) said casing assembly with its related telephone apparatus units comprising (1) an elongated hollow arm with one side open, hollow, head enlargments at each end thereof, (2) end closures having removability permitting securing means for said side openings of said end enlargements with (3) one said closure retaining a transmitter sub-unit in place and (4) the other said closure retaining a receiving sub-unit in place, (5) said hollow arm being open throughout the length of a side between and opening into said end enlargement openings and (6) a removable side in, and filling said opening of said arm, secured in place by said end opening closures and carrying on and along the length of its inner face a plurality of electrical sub-units including, at least an amplifier sub-unit and a dry cell power sub-unit of said telephone apparatus.

2. A telephone handset unit of the self-contained and self-powered amplifying type comprising; in combination, (a) a simple, compact hollow handset casing assembly of a few removably interconnected parts and (b) a complete telephone apparatus including a calling push button switch sub-unit and a communicating push button switch sub-unit in said hollow casing assembly and divided into readily serviced sub-units with at least certain of them forming readily removable sub-assemblies retained in place by corresponding ones of said casing assembly parts for the best utilization of available space in such a compact handset casing with (c) circuit means operatively interconnecting said telephone sub-units and including contacts cooperatively engaged upon the assembly insertion of each such telephone sub-unit, (d) said casing assembly with its related telephone apparatus units comprising (1) an elongated hollow arm with one side open, hollow, head enlargements at each end thereof, (2) a transmitter sub-unit removably mounted in one of said enlargements and (3) a receiving sub-unit removably mounted in the other of said enlargements, (4) said calling push button switch sub-unit being located in, and extending through the back of, said receiving unit containing, hollow end enlargement, (5) said hollow arm being open throughout the length of a side between said end enlargement openings, (6) a removable side cover in, and filling, said opening of said arm, and carrying on its inner face at least an amplifier sub-unit, a dry cell power sub-unit, and (7) said transmitting push button switch sub-unit being mounted on the inner face of said side cover with its transmitting button extending through to the outer face of said side cover and (8) means to hold said removable side cover in place.

3. A telephone handset unit of the self-contained and self-powered amplifying type comprising, in combination, (a) a simple, compact hollow handset casing assembly of a few removably interconnected parts and (b) a complete telephone apparatus in said hollow casing assembly divided into readily serviced units with at least certain of them being mounted on, and forming readily removable sub-assemblies with, said casing assembly parts for the best utilization of available space in such a compact handset casing, (c) electrical circuit means operatively interconnecting said telephone units and including contacts cooperatively engaged upon the assembly insertion of each such telephone unit, (d) said casing assembly with its related telephone apparatus units comprising (1) an elongated hollow arm with one side open, hollow, head enlargements at each end thereof, (2) a transmitter unit removably mounted in one of said enlargements and (3) a receiving unit removably mounted in the other of said enlargements, (4) said hollow arm being open throughout the length of a side between said end enlargement openings, (5) a removable side cover in, and filling, said opening of said arm, and carrying on its inner face at least an amplifier unit and a dry cell power unit of said telephone apparatus and (6) means to hold said removable side cover in place.

4. As a complete article of manufacture, a telephone handset unit of the self-contained and self-powered amplifying type comprising; in combination, (a) a simple, compact hollow handset casing assembly of a few removably interconnected parts and (b) a complete telephone apparatus, including a calling push button switch sub-unit and a communicating push button switch sub-unit, in said hollow casing assembly and divided into readily serviced electrical sub-units forming readily removable sub-assemblies retained in place by corresponding ones of said casing assembly parts for the best utilization of available space in such a compact handset casing with (c) electrical circuit means operatively interconnecting said telephone sub-units and including contacts cooperatively engaged upon the assembly insertion of each such telephone sub-unit, (d) said casing assembly with its related telephone apparatus sub-units comprising (1) an elongated hollow arm with hollow head enlargements at each end thereof, (2) one piece, outer, end closures having removability permitting, thread type, securing means for said openings of said end enlargements with (3) one said outer closure retaining a transmitter sub-unit by its inner face and (4) the other said outer closure retaining a receiving sub-unit by its inner face, (5) said calling push button switch sub-unit being located in and extending through the back of said receiving sub-unit containing, hollow, end enlargement, (6) said hollow arm being open throughout the length of a side between and opening into, said end enlargement openings and (7) a removable side cover in, and filling, said opening of said arm, engaged and secured in place by said end opening closures and carrying on and extending along the length of its inner face a plurality of said electrical sub-units including, at least, a transistor type amplifier sub-unit, a calling buzzer sub-unit, a dry cell power sub-unit and (8) said transmitting push button switch sub-unit being mounted on the inner side of said side cover with its transmitting button extending through to the outer face of said side cover.

References Cited in the file of this patent

UNITED STATES PATENTS

| | | |
|---|---|---|
| 2,808,461 | Thomas | Oct. 1, 1957 |
| 2,874,229 | Lilley | Feb. 17, 1958 |
| 2,870,255 | Jenkins | Jan. 20, 1959 |

OTHER REFERENCES

Germany, VIII, M21704 a/21a², Aug. 2, 1956.